US007548030B2

(12) United States Patent
Korcharz et al.

(10) Patent No.: US 7,548,030 B2
(45) Date of Patent: Jun. 16, 2009

(54) COLOR CONTROL FOR DYNAMIC SCANNING BACKLIGHT

(75) Inventors: Dror Korcharz, Bat Yam (IL); Arkadiy Peker, New Hyde Park, NY (US); Alon Ferentz, Bat Yam (IL); Tamir Langer, Givataim (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 0 days.

(21) Appl. No.: 12/049,410

(22) Filed: Mar. 17, 2008

(65) Prior Publication Data

US 2008/0238341 A1    Oct. 2, 2008

Related U.S. Application Data

(60) Provisional application No. 60/908,709, filed on Mar. 29, 2007.

(51) Int. Cl.
*H05B 37/02* (2006.01)
(52) U.S. Cl. ............... 315/307; 315/155; 315/297
(58) Field of Classification Search ................ 315/149, 315/155, 185 R, 224, 246–247, 291, 294, 315/297, 299, 307, 308, 312, 360; 345/83–84, 345/87–88, 99, 102, 204, 213, 214; 362/227, 362/612, 800
See application file for complete search history.

(56) References Cited

U.S. PATENT DOCUMENTS

| | | | |
|---|---|---|---|
| 5,387,921 A | 2/1995 | Zhang et al. |
| 5,717,978 A | 2/1998 | Mestha |
| 6,127,783 A | 10/2000 | Pashley et al. |
| 6,194,839 B1 | 2/2001 | Chang |
| 6,201,353 B1 | 3/2001 | Chang et al. |
| 6,373,964 B1 | 4/2002 | Geissler et al. |

(Continued)

FOREIGN PATENT DOCUMENTS

WO    2004084170 A1    9/2004

(Continued)

OTHER PUBLICATIONS

Perduijn et al; Light Output Feedback Solution for RGB LED Backlight Application, SID 00 Digest pp. 1-3, The Society for Information Display, San Jose, California, TXL Mar. 21, 2009.

(Continued)

*Primary Examiner*—David Hung Vu
*Assistant Examiner*—Tung X Le
(74) *Attorney, Agent, or Firm*—Simon Kahn

(57) ABSTRACT

A method of controlling the output of a luminaire by receiving a first target signal associated with a first frame; generating a first light output control signal for an on time portion of the first frame, the light output control signal responsive to the received first target signal; sampling a light output during the on time portion of the first frame, the light output being responsive to the first light output control signal; receiving a second target signal associated with a second frame, the second frame following the first frame; comparing the received second target signal with the sampled light output of the on time portion of the first frame; and generating an error signal responsive to the comparing.

25 Claims, 5 Drawing Sheets

U.S. PATENT DOCUMENTS

| | | |
|---|---|---|
| 6,411,046 B1 | 6/2002 | Muthu |
| 6,441,558 B1 | 8/2002 | Muthu |
| 6,521,879 B1 | 2/2003 | Rand et al. |
| 6,611,249 B1 | 8/2003 | Evanicky et al. |
| 6,870,525 B2 | 3/2005 | Kawabata et al. |
| 6,894,442 B1 | 5/2005 | Lim et al. |
| 6,930,737 B2 | 8/2005 | Weindorf et al. |
| 7,001,059 B2 | 2/2006 | Han et al. |
| 7,255,462 B2 | 8/2007 | Tseng |
| 7,315,288 B2 | 1/2008 | Livingston et al. |
| 7,348,949 B2 | 3/2008 | Lee et al. |
| 2004/0135522 A1 | 7/2004 | Berman et al. |
| 2005/0212459 A1* | 9/2005 | Patel et al. ............. 315/291 |
| 2005/0231127 A1 | 10/2005 | Yamamoto et al. |
| 2005/0231459 A1 | 10/2005 | Furukawa |
| 2006/0038769 A1 | 2/2006 | Marra et al. |
| 2006/0050529 A1 | 3/2006 | Chou et al. |
| 2006/0108933 A1 | 5/2006 | Chen |
| 2006/0132423 A1 | 6/2006 | Travis |
| 2006/0221047 A1 | 10/2006 | Tanizoe et al. |
| 2007/0046485 A1 | 3/2007 | Grootes et al. |
| 2007/0182701 A1* | 8/2007 | Kim et al. ............. 345/102 |
| 2008/0018267 A1* | 1/2008 | Arakawa et al. ............. 315/301 |

FOREIGN PATENT DOCUMENTS

| | | |
|---|---|---|
| WO | 2005111976 A1 | 11/2005 |
| WO | 2006070323 A1 | 7/2006 |

OTHER PUBLICATIONS

Perduijn et al; Light Output Feedback Solution for RGB LED Backlight Application, SID 03 Digest pp. 1254-1256, The Society for Information Display, San Jose, California, TXL Mar. 21, 2009.

Chen et al, LED Back-Light Driving System for LCD Panels, Applied Power Electronics Conference and Exposition, 2006, Published Mar. 19-23, 2006, IEEE New York.

Li, Perry Y. and Dianat, Sohail A., Robust Stabilization of Tone Reproduction Curves for the Xerographic Printing Process, IEEE Transaction on Control Systems Technology, vol. 9, No. 2, Mar. 2001, pp. 407-415, published IEEE, New York.

Li, Perry Y. and Dianat, Sohail A., Robust Stabilization of Tone Reproduction Curves for the Xerographic Printing Process, 1998 IEEE Conference on Control Applications, Sep., Trieste, 1998, published IEEE, New York.

* cited by examiner

COLOR CONTROL FOR DYNAMIC SCANNING BACKLIGHT

CROSS-REFERENCE TO RELATED APPLICATIONS

This application claims priority from U.S. Provisional Patent Application Ser. No. 60/908,709 filed Mar. 29, 2007, entitled "Color Control for Dynamic Scanning Backlight", the entire contents of which is incorporated herein by reference.

BACKGROUND OF THE INVENTION

The present invention relates to the field of light emitting diode based lighting and more particularly to a method of improved color control for LED backlighting.

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a matrix display. In a large LCD matrix display typically the LEDs are supplied in one or more strings of serially connected LEDs, thus sharing a common current. Matrix displays typically display the image as a series of frames, with the information for the display being drawn from left to right in a series of descending lines during the frame.

In order supply a white backlight for the matrix display one of two basic techniques are commonly used. In a first technique one or more strings of "white" LEDs are utilized, the white LEDs typically comprising a blue LED with a phosphor which absorbs the blue light emitted by the LED and emits a white light. In a second technique one or more individual strings of colored LEDs are placed in proximity so that in combination their light is seen as a white light. Often, two strings of green LEDs are utilized to balance one string each of red and blue LEDs.

In either of the two techniques, the strings of LEDs are in one embodiment located at one end or one side of the matrix dispaly, the light being diffused to appear behind the LCD by a diffuser. In another embodiment the LEDs are located directly behind the LCD, the light being diffused, so as to avoid hot spots, by a diffuser. In the case of colored LEDs, a further mixer is required, which may be part of the diffuser, to ensure that the light of the colored LEDs is not viewed separately, but rather are mixed to give a white light. The white point of the light is an important factor to control, and much effort in design in manufacturing is centered on the need to maintain a correct white point.

Each of the colored LED strings is typically intensity controlled by both amplitude modulation (AM) and pulse width modulation (PWM) to achieve an overall fixed perceived luminance. AM is typically used to set the white point produced by the disparate colored LED strings by setting the constant current flow through the LED string to a value achieved as part of a white point calibration process and PWM is typically used to variably control the overall luminance, or brightness, of the monitor without affecting the white point balance. Thus the current, when pulsed on, is held constant to maintain the white point among the disparate colored LED strings, and the PWM duty cycle is controlled to dim or brighten the backlight by adjusting the average current. The PWM duty cycle of each color is further modified to maintain the white point, preferably responsive to a color sensor, such as an RGB color sensor. The color sensor is arranged to receive the mixed white light, and thus a color control feedback loop may be maintained. It is to be noted that different colored LEDs age, or reduce their luminance as a function of current, at different rates and thus the PWM duty cycle of each color must be modified over time to maintain the white point set by AM.

One known problem of LCD matrix displays is motion blur. One cause of motion blur is that the response time of the LCD is finite. Thus, there is a delay from the time of writing to the LCD pixel until the image changes. Furthermore, since each pixel is written once per scan, and is then held until the next scan, smooth motion is not possible. The eye notices the image being in the wrong place until the next sample, and interprets this as a blur or smear.

This problem is addressed by a scanning backlight, in which the matrix display is divided into a plurality of regions, or zones, and the backlight for each zone is illuminated for a short period of time in synchronization with the writing of the image. Ideally, the backlighting for the zone is illuminated just after the pixel response time, and the illumination is held for a predetermined illumination frame time whose timing is associated with the particular zone.

An additional known problem of LCD matrix displays is the lack of contrast, and in particular in the presence of ambient light. An LCD matrix display operates by providing two linear polarizers whose orientation in relation to each other is adjustable. If the linear polarizers are oriented orthogonally to each other, light from the backlight is prevented from being transmitted in the direction of the viewer. If the linear polarizers are aligned, the maximum amount of light is transmitted in the direction of the viewer. Unfortunately, a certain amount of light leakage occurs when the polarizers are oriented orthogonally to each other, thus reducing the overall contrast.

This problem is addressed by adding dynamic capability to the scanning backlight, the dynamic capability adjusting at least one of the overall luminance and the color balance of the backlight for each zone responsive to the current video signal. Thus, in the event of a dark scene, the backlight luminance is reduced thereby improving the contrast. It is further expected that in certain conditions the color balance may be further adjusted responsive to the current video signal, thereby improving the color range. Since the color, and overall luminance, of a scene may change on a frame by frame basis, the color control feedback loop must rapidly respond to changes in desired color and/or luminance. In such an embodiment the color control feedback loop must feed back and control the color balance and luminance. It is to be noted that a new frame begins every 16.7-20 milliseconds, depending on the system used.

The prior art teaches that samples of the LED backlighting be passed through a low pass filter (LPF) exhibiting a frequency cutoff 40 dB less than the PWM frequency, i.e. $1/100$ of the PWM frequency. Thus, for a PWM frequency on the order of 2 kHz an LPF exhibiting a cutoff frequency of 20 Hz is taught which is lower than the frame cycle time. Thus, there is no opportunity to correct the LED color during a frame. The above is further compounded by the fact that the LEDs are only enabled for approximately $1/4$ of the frame.

U.S. Pat. No. 6,894,442 issued May 17, 2005 to Lim et al is addressed to a light source and a method for controlling same. Lim provides for a low pass filter, whose response is long in relation to the PWM period. When a target light value is changed, a control signal is initially replaced by a predicted control signal based on the new target value, rather than the error signal generated in a servo. The need to generate and store predicted control information adds to cost.

What is needed, and not provided by the prior art, is a means for operating a feedback color loop of a PWM controlled light source whose target value may be changed on a frame by frame basis.

SUMMARY OF THE INVENTION

Accordingly, it is a principal object of the present invention to overcome the disadvantages of prior art. This is provided in the present invention by a color control loop operative to complete at least one cycle between a change in a target value and enabling an LED. Thus, the color control loop generates a correction to the PWM value of the LED responsive to the sensed LED output prior to the change in target value and the new target value. Preferably, only a single cycle is performed prior to enabling the LED at the new value.

In certain embodiments, the invention provides for a method of controlling the output of a luminaire comprising: receiving a first target signal associated with a first frame; generating a first light control signal for an on time portion of the first frame, the light control signal responsive to the received first target signal; sampling a light output during the on time portion of the first frame, the light output being responsive to the first light control signal; receiving a second target signal associated with a second frame, the second frame following the first frame; comparing the received second target signal associated with the second frame with the sampled light output of the on time portion of the first frame; and generating an error signal responsive to the comparing.

In one further embodiment the method further comprises: generating a second light control signal for an on time portion of the second frame, the generated second light control signal responsive to the generated error signal.

In another further embodiment, generating the first light control signal comprises generating a pulse width modulated signal exhibiting a period and a duty cycle, and wherein the sampling the light output comprises: repeatedly sampling the light output during the on time portion of the first frame; and averaging the repeated samplings to generate an average per the period. In one yet further embodiment the sampled light output of the first frame being compared with the received second target signal is the average of the repeated samplings of a last period of the on time of the first frame.

In another further embodiment, the method further comprises adjusting the first light control signal during the on time portion of the first frame responsive to the sampled light output of the on time portion of the first frame. In one yet further embodiment, the generating the first light control signal comprises generating a pulse width modulated signal exhibiting a period and a duty cycle, and wherein the adjusting the first light control signal comprises adjusting the duty cycle. In another yet further embodiment the method further comprises generating a pulse width modulated light control signal for an on time portion of the second frame exhibiting the period and a duty cycle responsive to the generated error signal.

In one further embodiment, generating the first light control signal for the on time portion of the first frame comprises: enabling a pulse width modulation exhibiting a duty cycle and a period; enabling a feedback controller associated with the pulse width modulation; and adjusting, responsive to the enabled feedback controller, the duty cycle of the first light control signal during the on time portion of the first frame responsive to the sampled light output of the on time portion of the first frame. In another further embodiment the method further comprises: receiving a synchronizing signal; waiting a first period; and enabling the first light control signal for the on time portion of the first frame at the expiration of the first period. Preferably, the first period is a function of the zone associated with the luminaire.

In certain embodiments, the invention provides for a method of controlling the output of a luminaire comprising a plurality of LED strings, the method comprising: receiving a first target signal associated with a first frame; generating a plurality of pulse width modulated first light control signals for a portion of the first frame responsive to the received first target signal, the pulse width modulated first light output signals exhibiting a period and a respective first duty cycle for each of the plurality of LED strings; sampling a light output of the plurality of LED strings at discrete intervals during the portion of the first frame, the light output being responsive to the pulse width modulated first light control signals; averaging the samples of the first frame over at least one of the period; adjusting, during the first frame, the first duty cycle of at least one of the plurality of pulse width modulated first light control signals responsive to the averaging; receiving a second target signal associated with a second frame, the second frame following the first frame; comparing the received second target signal with a least one of the averages; and generating a plurality of pulse width modulated second light control signals for a portion of the second frame exhibiting the period and a respective second duty cycle for each of the plurality of LED strings, the second duty cycles being responsive to the comparing.

In certain embodiments the invention provides for a backlight luminaire controller for a frame by frame changing target signal, the backlight luminaire controller comprising: a synchronizing controller; a difference circuit; a feedback controller responsive to the synchronizing controller and the difference circuit; a pulse width modulation (PWM) functionality exhibiting a duty cycle and a period, the duty cycle being responsive to the feedback controller; and an averager responsive to the feedback controller and operative to generate at least one average over an integer multiple of the period, the feedback controller operative responsive to the synchronizing controller to generate a duty cycle for the next frame responsive to at least one of the generated at least one average of the current frame and a received target signal of the next frame.

In certain embodiments the invention yet further provides for a backlight system comprising the backlight luminaire controller; a luminaire arranged to produce light responsive to the PWM functionality, the produced light exhibiting a luminance and a color balance; a sensor arranged to receive a portion of the produced light; a low pass filter arranged to receive the output of the sensor; and an analog to digital converter in communication with the low pass filter, wherein the averager is in communication with the analog to digital converter, the integer is one, and the averager is operative to output an indication of the luminance and the color balance of the produced light for at least one particular period of the pulse width modulation functionality.

In one yet further embodiment, the low pass filter exhibits a cutoff frequency on the order of $1/10$ of the frequency of the pulse width modulation period. In one even further embodiment the pulse width modulation functionality exhibits an n-bit division of the period, and the analog to digital converter exhibits a sampling rate less than the frequency associated with the n-bit division of the period.

In one yet further embodiment the backlight system further comprises a calibration matrix coupled to the averager and operative to convert the at least one average indication to a system consonant with the frame by frame changing target signal. In another yet further embodiment the feedback controller is operative in a single cycle mode. Preferably, the synchronizing controller is operative to operate the feedback controller in the single cycle mode for a single cycle prior to producing light of the next frame from the luminaire.

In certain embodiments the invention provides for an apparatus for controlling a luminaire responsive to a target signal with a value changing on a frame by frame basis, the apparatus comprising: a feedback controller; a signal generator, responsive to the feedback controller and operative to generate a light control signal for an on time portion of a first frame responsive to a first frame target signal value; a sampler operative to sample a light output during the on time portion of the first frame, the light output being responsive to the generated light control signal of the first frame; and a difference circuit arranged to compare a second frame target signal value with the sampled light output of the on time portion of the first frame and generate an error signal responsive to the comparison, wherein the feedback controller is operative to control the signal generator to generate a light control signal for an on time portion of the second frame responsive to the error signal.

In one further embodiment, the feedback controller is further operative to control the signal generator so as to adjust the light control signal during the on time portion of the first frame responsive to the sampled light output. In one even further embodiment, the signal generator comprises a pulse width modulated functionality exhibiting a period and a duty cycle, and wherein the sampler is operative to: repeatedly sample the light output during the on time portion of the first frame; and average the repeated samplings to generate an average per the period, wherein the control of the signal generator by the feedback controller is responsive to the average of the repeated samplings. In another even further embodiment, the sampled light output of the first frame being compared with the second frame target signal value is the average of the repeated samplings of a last period of the on time of the first frame. In yet another even further embodiment the adjusting of the feedback controller comprises adjusting the duty cycle. In yet another even further embodiment the signal generator is further operative to generate a pulse width modulated signal for an on time portion of the second frame exhibiting the period and a duty cycle responsive to the feedback controller.

In one further embodiment the signal generator comprises a pulse width modulation functionality, and wherein the generating the light control signal for the on time portion of the first frame comprises: enable the pulse width modulation exhibiting a duty cycle and a period; and enable the feedback controller.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
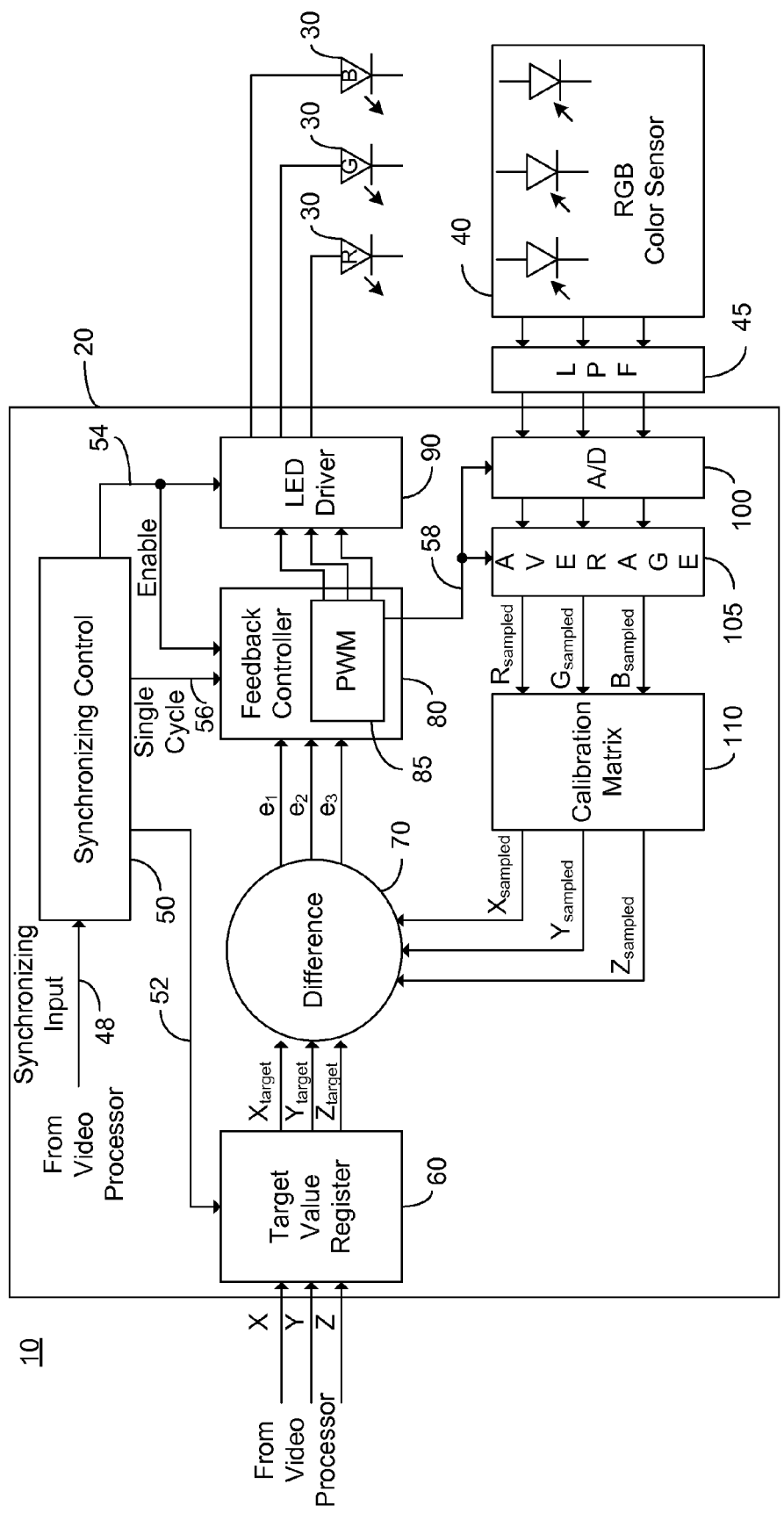
FIG. 1 illustrates a high level block diagram of a color control loop for LED backlighting in accordance with a principle of the invention.

The present embodiments enable a color control loop operative to complete at least one cycle between a change in a target value and enabling an LED. Thus, the color control loop generates a correction to the PWM value of the LED responsive to the sensed LED output prior to the change in target value and the new target value. Preferably, only a single cycle is performed prior to enabling the LED at the new value.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a color control loop 10 for LED backlighting in accordance with a principle of the invention comprising: a backlight luminaire controller 20, a plurality of LED strings 30, an RGB color sensor 40 and a low pass filter (LPF) 45. Color control loop 10 preferably represents a particular zone of a scanning backlight. It is to be understood that in one embodiment each zone comprises a dedicated color loop 10, and in another embodiment a single backlight controller 20 is shared among a plurality of zones. Backlight luminaire controller 20 comprises: a synchronizing controller 50, a target value register 60, a difference circuit 70, a feedback controller 80, an LED driver 90, an A/D converter 100, a sample averager 105 and a calibration matrix 110. Feedback controller 80 preferably comprises a PWM functionality 85 and exhibits a sampler control signal 58 connected to the control input of sample averager 105 and to the control input of A/D converter 100. Synchronizing controller 50 exhibits an enable output 54, connected to an enable input of both LED driver 90 and feedback controller 80, a single cycle enable output 56 connected to a single cycle enable input of feedback controller 80, a target value register latching output 52 connected to the latching input of target value register 60 and a synchronizing input 48. In one embodiment, synchronizing input 48 comprises a vertical sync input, exhibiting a sync pulse indicative of the beginning of a frame, and in another embodiment synchronizing input 48 comprises a backlight on/off signal for the respective zone of the scanning backlight. In yet another embodiment synchronizing input 48 comprises a combination of the vertical sync input indicative of the beginning of a frame, and a backlight on/off signal for the respective zone.

Target values, respectively denoted X,Y,Z, issued by a video processor (not shown), and representative of desired X,Y,Z values of the combined light output of LED strings 30 are received at the input of target value register 60. The target values contain information on both the desired color balance and luminance. The outputs of target value register 60, representing latched desired X,Y,Z values from the video processor, and respectively denoted $X_{target}$, $Y_{target}$ and $Z_{target}$, are connected to first respective inputs of difference circuit 70 and the outputs of difference circuit 70, respectively denoted $e_1$, $e_2$ and $e_3$ are connected to respective error correction inputs of feedback controller 80. The outputs of feedback controller 80, preferably representing pulse width modulated driving signals for each of the plurality of LED strings 30 generated by PWM functionality 85 are connected to respective inputs of LED driver 90, and the outputs of LED driver 90 are respectively connected to driving inputs of LED strings 30. As described above, sampler control signal 58 is connected to the control input of sample averager 105 and A/D converter 100.

RGB color sensor 40 is optically connected to LED strings 30 and arranged to receive a mixed light signal representative of the output of LED strings 30. The respective outputs of RGB color sensor 40 are connected to respective inputs of LPF 45, which in one embodiment exhibits a cutoff frequency less than 40 dB below the PWM period frequency. The respective outputs of LPF 45 are connected to respective inputs of A/D converter 100, and the respective outputs of A/D converter 100 are connected to the respective inputs of sample averager 105. The respective outputs of sample averager 105, denoted respectively $R_{sampled}$, $G_{sampled}$ and $B_{sampled}$, are connected to respective inputs of calibration matrix 110, and the respective outputs of calibration matrix 110, denoted respectively $X_{sampled}$, $Y_{sampled}$ and $Z_{sampled}$, are connected to respective second inputs of difference circuit 70.

In operation, X,Y,Z target values for the combined output of LED strings 30 are received at target value register 60, the target values being generated by a video processor (not shown). In a preferred embodiment, X,Y,Z target values for the next frame are received, and are valid, in advance of the beginning of the frame. The validity of the X,Y,Z target values, and the appropriate timing for the enabling of LED strings 30 are preferably a function of the signal appearing at synchronizing input 48 and will be described further in relation to FIG. 2 below. In one embodiment, described further below in relation to FIG. 3A, the validity of the X,Y,Z target values, and the appropriate timing for the enabling of LED strings 30 are determined in relation to the received signal at synchronizing input 48, preferably the vertical sync signal. In another embodiment, described further below in relation to FIG. 3B, a backlight on/off signal is received from the video processor (not shown) at synchronizing input 48, the backlight on/off signal being indicative of the appropriate timing for the enabling of LED strings 30. In one further embodiment the validity of the X,Y,Z target values is determined responsive to the received backlight on/off signal and in another further embodiment the validity of the X,Y,Z target values is determined by the receipt of a separate validity signal from the video processor (not shown) at synchronizing input 48. Valid X,Y,Z target values are latched into target value register 60 responsive to target value register latching output 52 of synchronizing controller 50.

Responsive to the appropriate timing for the enabling of LED strings 30, whether determined or responsive to a received backlight on/off signal, synchronizing controller 50 outputs an active signal at enable output 54, which is received at LED driver 90 and LED driver 90 responsively drives LED strings 30 with a PWM signal generated by PWM functionality 85. PWM functionality 85 exhibits a period and an n-bit division of the period. In one non-limiting embodiment PWM functionality 85 exhibits a frequency of about 2 KHz equivalent to a period of about 500 μseconds and further exhibits a 12 bit division. Such a 12 bit division is associated with an 8 MHz oscillator frequency which is required to generate such a 12 bit division. Enable output 54 is further received at feedback controller 80 and feedback controller 80, responsive to the active signal condition of enable output 54, enables the operation of the feedback loop by repetitively sampling the output of RGB color sensor 40 via sampler control signal 58 and adjusts the operation of one or more of the LED strings 30 responsive to the output of difference circuit 70. Preferably, the operation of one or more of LED strings 30 is adjusted by adjusting the duty cycle of PWM functionality 85 of feedback controller 80 associated with one or more of LED strings 30. In one embodiment feedback controller 80 comprises a proportional integral controller known to the prior art and in another embodiment feedback controller 80 comprises a deadbeat controller.

As indicated above, a portion of the output of LED strings 30 is optically coupled to the input of RGB color sensor 40, and the outputs of RGB color sensor 40 are passed through LPF 45 which acts to reduce the ripple and perform a first order average over adjacent subunits of the PWM period. In one embodiment the cutoff frequency of LPF 45 is of the order of 20 dB less than the PWM frequency, i.e. 1/10 of the frequency, which represents a significantly greater cutoff frequency than taught in the prior art and thus a significantly faster response time. The output of LPF 45 is repetitively sampled and digitized by A/D converter 100, which preferably incorporates a sample and hold circuit at its input. A/D converter 100 is a high speed converter exhibiting a sampling rate in excess of 25 samples per color per PWM period, and is preferably synchronized with the timing of PWM functionality 85 by sampler control signal 58. The output of A/D converter 100 is averaged over a PWM period by sample averager 105, whose output thus changes responsive to each actual PWM period. Sample averager 105 is synchronized with PWM functionality 85 by sampler control signal 58.

The speed of A/D converter 100 and the PWM period time is a factor in the determination of the cutoff frequency of LPF 45. The combination of A/D converter 100 and LPF 45 function to provide sample averager 105 with sufficient samples to properly identify the actual intensity of LEDs 30 responsive to the PWM duty rate of PWM functionality 85. Thus, in the event of a 12 bit PWM exhibiting a 2 KHz cycle, an A/D converter exhibiting a sampling of at least 8 MHz would be required per channel, and preferably 16 MHz, in order to properly sample the PWM output. The combination of LPF 45 and A/D converter 100 is thus selected so as to achieve a proper sampling of the PWM output with a reasonable priced A/D converter. The output of sample averager 105 is thus available just after the beginning of the next PWM period. In an exemplary embodiment, changes in the PWM duty rate appear at the output of sample averager 105 with a delay of up to 1 cycle, and thus alternate cycles are averaged and presented to difference circuit 70 via calibration matrix 110. The use of alternate cycles takes into account the delay incurred due to LPF 45. Thus, changes in the PWM duty cycle are not delayed from appearing at the output of A/D converter 100 during the frame time and thus correction to the PWM duty rate occurs during the frame time.

In one embodiment, the LPF requires a plurality of periods to fully integrate the changed PWM duty cycle, and sampler averager 105 selects one of a particular period of a plurality of periods and an average of a integer multiple of periods to pass to feedback controller 80. Thus, in such an embodiment feedback controller 80 is operative at a lower sampling rate than the PWM period with the relationship being governed by the number of integer multiple periods needed to properly detect a changed PWM duty cycle.

In another embodiment, a low pass filter is not implemented, and instead A/D converter 100 is implemented as a high speed A/D converter. In one yet further embodiment, the averager receives an input from the PWM functionality of feedback controller 80, the input indicative of the portion of the PWM period time for which none of the LED strings 30 are active. Samples are not taken during the inactive portion, and optionally A/D converter 100 is disabled, and instead the averager calculates $R_{sampled}$, $G_{sampled}$ and $B_{sampled}$ responsive to samples taken from the portion of the cycle time when at least one of the LED strings 30 are active and the portion of the cycle time for which no LED strings 30 are active.

The output of sample averager 105 is adjusted by calibration matrix 110 to closely resemble sampled X,Y,Z values respectively denoted $X_{sampled}$, $Y_{sampled}$ and $Z_{sampled}$. In a preferred embodiment, calibration matrix 110 is determined by a single pass of calibration values in which each of the colored LED strings 30 are lit independently at a predetermined PWM duty cycle and the resultant X,Y,Z values are determined by a calorimeter. The outputs of RGB sensor 40 are compared with the measured X,Y,Z values and calibration matrix 110 converting RGB sensor 40 values to the measured X,Y,Z values determined. Difference circuit 70 compares $X_{sampled}$, $Y_{sampled}$ and $Z_{sampled}$ with respective outputs $X_{target}$, $Y_{target}$ and $Z_{target}$ of target value register 60, and generates error signals respectively denoted $e_1$, $e_2$, $e_3$. Feedback controller 80, responsive to the received $e_1$, $e_2$, $e_3$ adjusts the duty cycle of PWM functionality 85, or other drive component, of one or more of LED strings 30 to correct the output to more closely match $X_{target}$, $Y_{target}$, and $Z_{target}$ of target value register 60.

As will be described further below in relation to FIGS. 2, 3A and 3B, responsive to the appropriate timing of the end of the enabling of LED strings 30, whether determined or responsive to a received backlight on/off signal, synchronizing controller 50 outputs an inactive signal at the enable output, which is received at LED driver 90, and LED driver 90 responsively ceases to drive LED strings 30. The inactive signal at the enable output of synchronizing controller 50 is further received at feedback controller 80 and feedback controller 80 responsively disables the operation of the feedback loop and the operation of PWM functionality 85 and sets sampler control signal 58 to inactive. The last averaged sample remains at the output of sampler averager 105 responsive to sampler control signal 58 becoming inactive.

Responsive to the validity of the X,Y,Z target values for the next frame, and responsive to the appropriate timing for the end of the enabling of LED strings 30 for the current frame, whether determined or responsive to a received backlight on/off signal, synchronizing controller 50 latches in the X,Y,Z target values for the next frame by enabling the target value register latching output signal and after allowing for propagation delays operates feedback controller 80 for a single cycle responsive the single cycle enable output of synchronizing controller 50. The single cycle of feedback controller 80 is based on the last output of sampler averager 105. It is understood that the resultant calculated drive signals do not represent a 100% correction factor, however advantageously the correction is sufficient to begin convergence between the $X_{target}$, $Y_{target}$, $Z_{target}$ values of the next frame and the $X_{sampled}$, $Y_{sampled}$ and $Z_{sampled}$ of the previous frame. Thus, upon the enabling of LED strings 30 of the next frame, the drive values output by feedback controller 80 more closely resemble the desired $X_{target}$, $Y_{target}$, $Z_{target}$ values than the drive values of the prior art.

Figure 2:
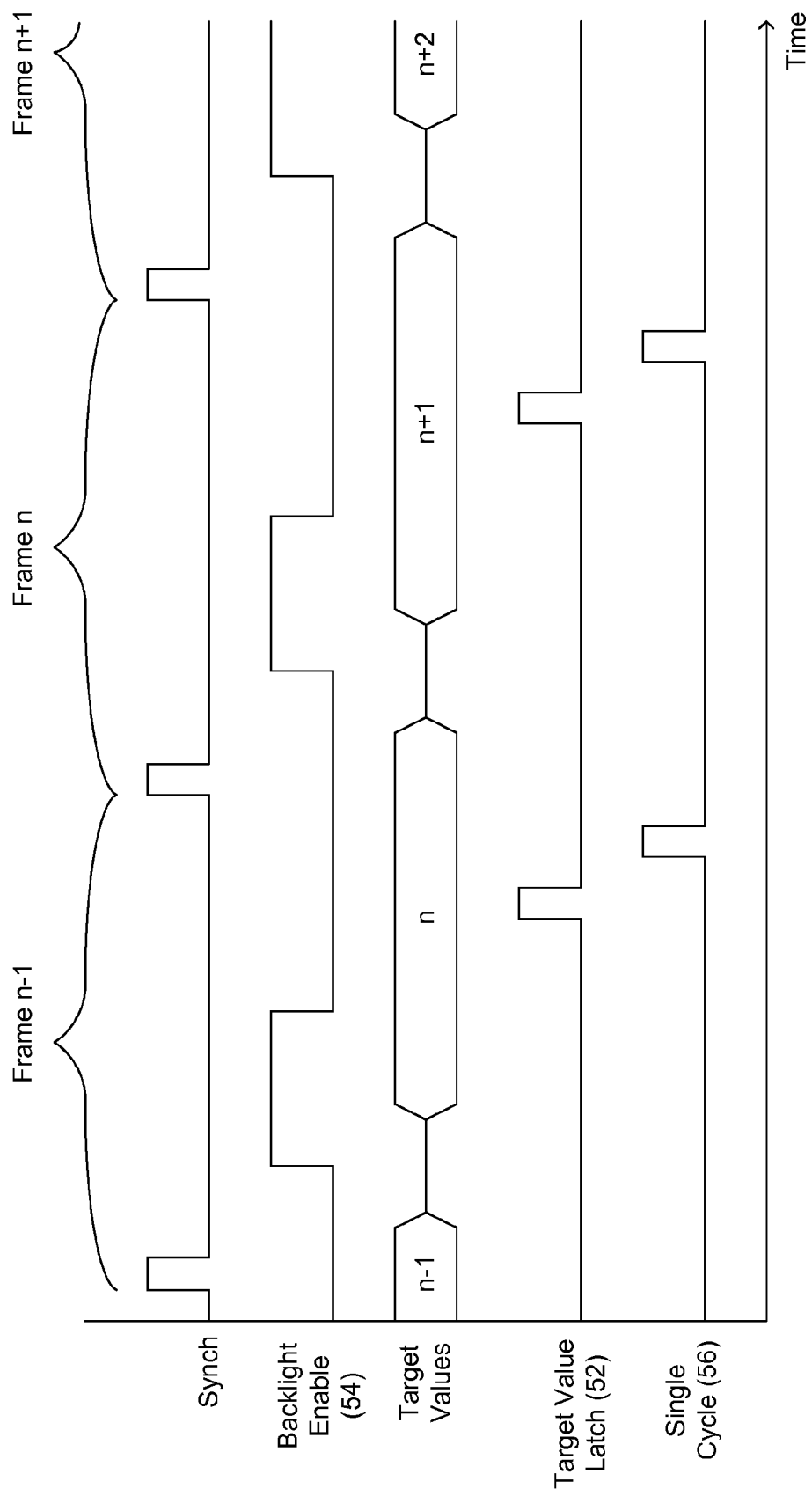
FIG. 2 illustrates a high level timing diagram of selected signals of the color control loop of FIG. 1.

FIG. 2 illustrates a high level timing diagram of selected signals of the color control loop of FIG. 1 in which the x-axis represents time proceeding from left to right and the y-axis represents various signal values exhibiting active high states. The selected signals of FIG. 2 are represented in frames, with the beginning of each frame being defined by the beginning of an active synchronizing input. At the beginning of frame n−1 the target X,Y,Z values for frame n−1 are shown as being valid. Some predetermined period after the beginning of frame n−1, enable output 54 of synchronizing controller 50 exhibits an active state for a predetermined period. Prior to the end of frame n−1, the target X,Y,Z values for frame n are shown as being valid, and target value register latching output 52 of synchronizing controller 50 exhibits an active state latching the valid target X,Y,Z values into target value register 60. Subsequent to the latching of the valid target X,Y,Z values for frame n into target value register 60, and subsequent to the end of the predetermined period of enable output 54 of synchronizing controller 50 being active, single cycle enable output 56 of synchronizing controller 50 exhibits an active state thereby enabling feedback controller 80 for a single cycle to begin convergence between $X_{target}$, $Y_{target}$, $Z_{target}$ values of frame n and the $X_{sampled}$, $Y_{sampled}$ and $Z_{sampled}$ of frame n−1.

At the beginning of frame n the target X,Y,Z values for frame n are shown as being valid. Some predetermined period after the beginning of frame n, enable output 54 of synchronizing controller 50 exhibits an active state for a predetermined period thereby enabling LED strings 30 and feedback controller 80 including PWM functionality 85. Prior to the end of frame n, the target X,Y,Z values for frame n+1 are shown as being valid, and target value register latching output 52 of synchronizing controller 50 exhibits an active state latching the valid target X,Y,Z values into target value register 60. Subsequent to the latching of the valid target X,Y,Z values for frame n+1 into target value register 60, and subsequent to the end of the predetermined period of enable output 54 of synchronizing controller 50 being active, single cycle enable output 56 of synchronizing controller 50 exhibits an active state thereby enabling feedback controller 80 for a single cycle to begin convergence between the $X_{target}$, $Y_{target}$, $Z_{target}$ values of frame n+1 and the $X_{sampled}$, $Y_{sampled}$ and $Z_{sampled}$ of frame n.

The timing of active enable output 54 is in a preferred embodiment zone dependent, with each zone of the LCD matrix display exhibiting a particular timing.

Figure 3A:
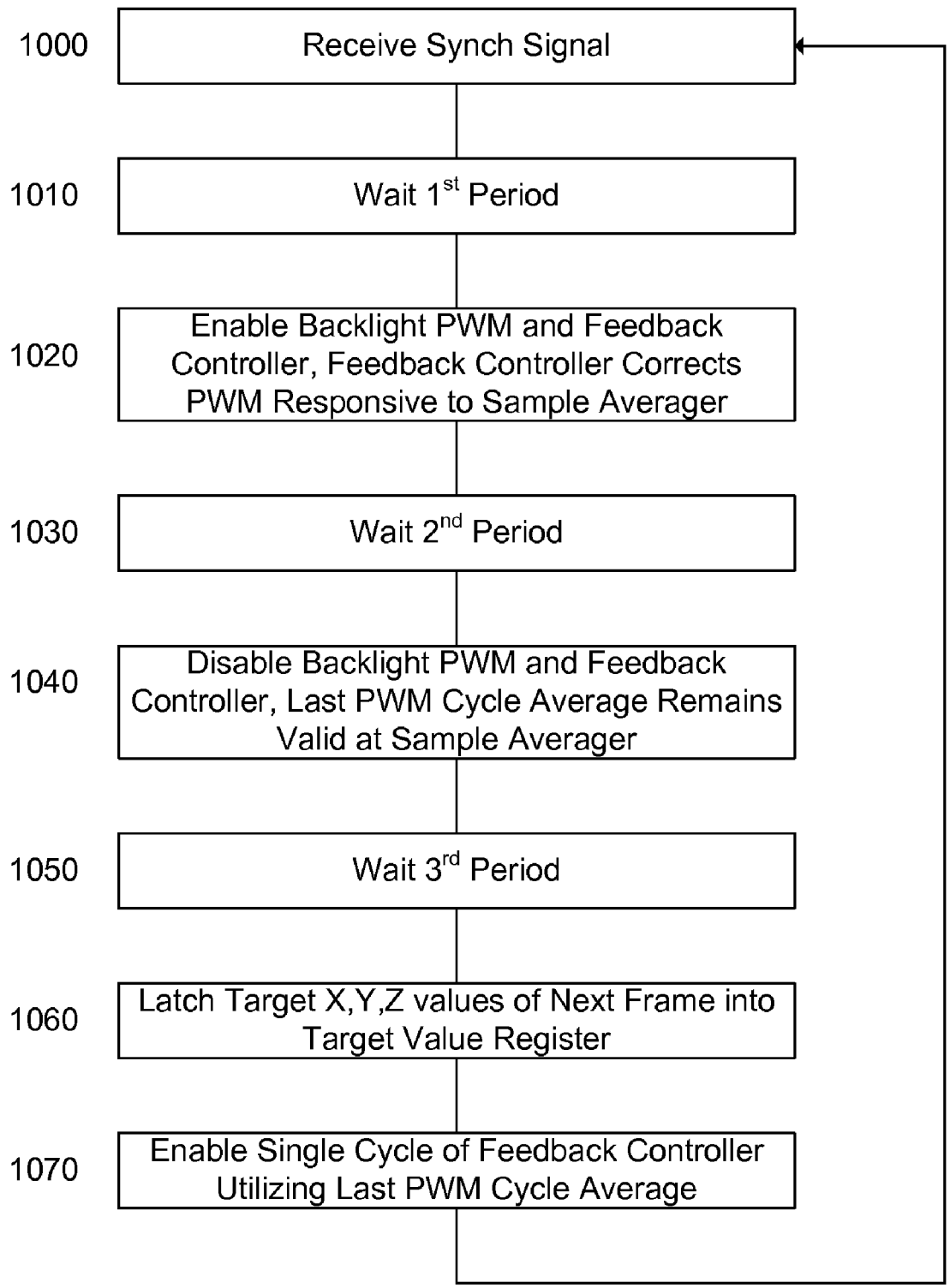
FIG. 3A illustrates a high level flow chart of a first embodiment of the operation of the color control loop of FIG. 1 in accordance with a principle of the invention.

FIG. 3A illustrates a high level flow chart of a first embodiment of the operation of the color control loop of FIG. 1 in accordance with a principle of the invention. In stage 1000, a synchronizing input signal is received at synchronizing input 48. In an exemplary embodiment the synchronizing signal is constituted of the vertical sync signal, which exhibits a pulse indicative of the beginning of a frame. In stage 1010, a first period is waited, the first period being designed to achieve the necessary delay between the received synchronizing input signal of stage 1000 and the appropriate time to enable the backlight of the subject zone. It is to be understood that for each zone a particular first period is defined, and there is no requirement for the first period to be identical across zones. In stage 1020, the backlight is enabled, preferably by setting enable output 54 of synchronizing controller 50 to active, and feedback controller 80 is enabled. In an embodiment in which feedback controller 80 comprises PWM functionality 85, PWM functionality 85 is further enabled. Enabling feedback controller 80 further enables repetitive sampling of RGB color sensor 40 via A/D converter 100 and the presentation of the average of each PWM period by sample averager 105. Feedback controller 80 is operative to reduce the absolute value of error signals $e_1$, $e_2$, $e_3$ toward zero.

In stage 1030 a second period is waited, the second period being designed to achieve the necessary delay between the enabling of stage 1020 and the end of the enabling period, i.e. the period of time for which LED strings 30 are to output light. In one embodiment, the second period is fixed portion of the frame time. In stage 1040, the backlight is disabled, preferably by setting enable output of synchronizing controller 50 to inactive, and feedback controller 80 is disabled. In an embodiment in which feedback controller 80 comprises PWM functionality 85, PWM functionality 85 is further disabled. Disabling feedback controller 80 further disables the calculation of an average PWM period output via A/D converter 100 and sample averager 105. The average of the last PWM period remains valid at the output of sample averager 105.

In stage 1050, a third period is waited, the third period being designed to achieve any necessary delay between the backlight disabling of stage 1040 and the validity of the target X,Y,Z value of the next frame. In one particular embodiment, the third period is zero, as shown in the timing diagram of FIG. 2. In stage 1060, the target X,Y,Z value of the next frame is latched into target value register 60, preferably by setting target value register latching output 52 of synchronizing controller 50 to active. In stage 1070, after allowing for any latch and propagation delays through difference circuit 70, feedback controller 80 is enabled for a single cycle, preferably by setting single cycle enable output 56 of synchronizing controller 50 to active. Feedback controller 80 operates a single cycle to at least partially adjust the PWM values for the first PWM period of the next frame responsive to the difference between the output of sample averager 105 of stage 1040, representative of the sensed light of the last PWM period of the previous frame, and the latched target X,Y,Z value of the next frame. The drive of LED strings 30 is not enabled at this stage, and is only enabled upon a subsequent performance of stage 1020. In an embodiment in which feedback controller 80 comprises PWM functionality 85 whose duty rate is adjusted responsive to the output of difference circuit 70, the duty rate of the next performance of stage 1020 will begin with the calculated duty rate of the single cycle of stage 1080. Stage 1000 as described above is then performed.

Thus, the method of FIG. 3A performs backlight enabling for a predetermined period, receives the target X,Y,Z values of the next frame, and adjusts a drive condition of the next frame responsive to the difference between the target X,Y,Z values of the next frame and the last averaged PWM period of the current frame responsive to a single synchronizing input signal constituted of a frame start signal such as the vertical sync pulse.

Figure 3B:
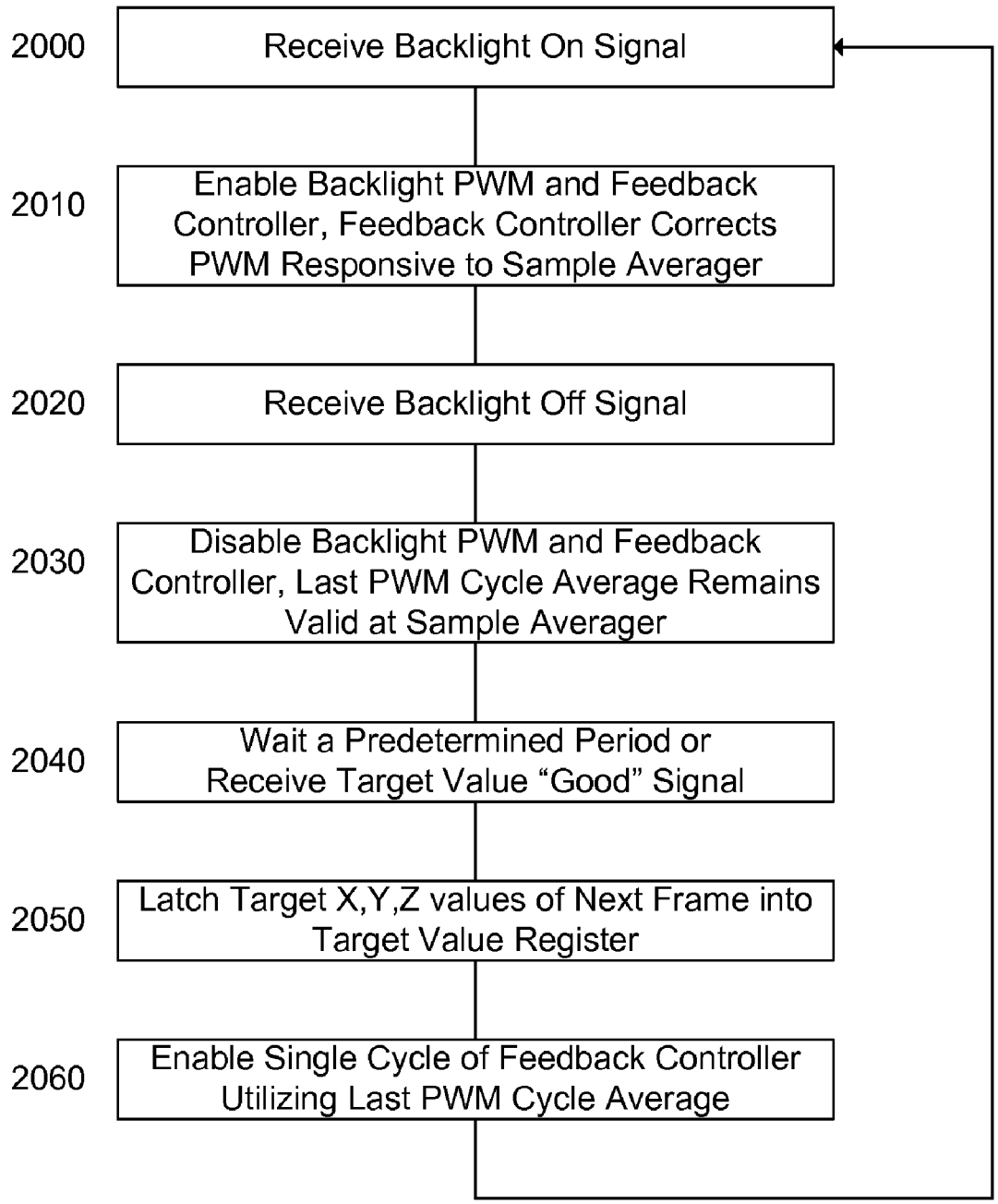
FIG. 3B illustrates a high level flow chart of a second embodiment of the operation of the color control loop of FIG. 1 in accordance with a principle of the invention.

FIG. 3B illustrates a high level flow chart of a second embodiment of the operation of the color control loop of FIG. 1 in accordance with a principle of the invention. In stage 2000, a synchronizing input signal constituted of a "backlight on" signal for the subject zone is received. In stage 2010, responsive to the received "backlight on" signal of stage 2000, the backlight is enabled, preferably by setting enable output 54 of synchronizing controller 50 to active, and feedback controller 80 is enabled. In an embodiment in which feedback controller 80 comprises PWM functionality 85, PWM functionality 85 is further enabled. Enabling feedback controller 80 further enables repetitive sampling of RGB color sensor 40 via A/D converter 100 and the presentation of the average of each PWM period by sample averager 105. Feedback controller 80 is operative to reduce the absolute value of error signals $e_1$, $e_2$, $e_3$ toward zero.

In stage 2020, a "backlight off" signal for the present zone is received. In an exemplary embodiment the "backlight off" signal is represented by the end of the active "backlight on" signal. In stage 2030, responsive to the "backlight off" signal of stage 2020, the backlight is disabled, preferably by setting enable output 54 of synchronizing controller 50 to inactive, and feedback controller 80 is disabled. In an embodiment in which feedback controller 80 comprises PWM functionality 85, PWM functionality 85 is further disabled. Disabling feedback controller 80 further disables the calculation of an average PWM period output via A/D converter 100 and sample averager 105. The average of the last PWM period remains valid at the output of sample averager 105.

In stage 2040, a wait period is waited, the wait period being designed to achieve the necessary delay between the "backlight off" signal of stage 2020 and the validity of the target X,Y,Z value of the next frame. In one particular embodiment, as shown in the timing diagram of FIG. 2, the wait period of stage 2040 is zero. In an alternative embodiment a dedicated "target value X,Y,Z good" signal, i.e. a validity signal, is received. In stage 2050, the target X,Y,Z value of the next frame is latched into target value register 60, preferably by setting target value register latching output 52 of synchronizing controller 50 to active. In stage 2060, after allowing for any latch and propagation delays through difference circuit 70, feedback controller 80 is enabled for a single cycle, preferably by setting single cycle enable output 56 of synchronizing controller 50 to active. Feedback controller 80 operates a single cycle to at least partially adjust the PWM values for the first PWM period of the next frame responsive to the difference between the output of sample averager 105 of stage 2030, representative of the sensed light of the last PWM period of the previous frame, and the latched target X,Y,Z value of the next frame. The drive of LED strings 30 is not enabled at this stage, and is only enabled upon a subsequent performance of stage 2010. In an embodiment in which feedback controller 80 comprises PWM functionality 85 whose duty rate is adjusted responsive to the output of difference circuit 70, the duty rate of the next performance of stage 2010 will begin with the calculated duty rate of the single cycle of stage 2060. Stage 2000 as described above is then performed.

Thus, the method of FIG. 3B performs backlight enabling for a predetermined period, receives the target X,Y,Z values of the next frame, and adjusts a drive condition of the next frame responsive to the difference between the target X,Y,Z values of the next frame and the last averaged PWM period of the current frame responsive to a single synchronizing signal constituted of a backlight on/off signal.

Figure 4:
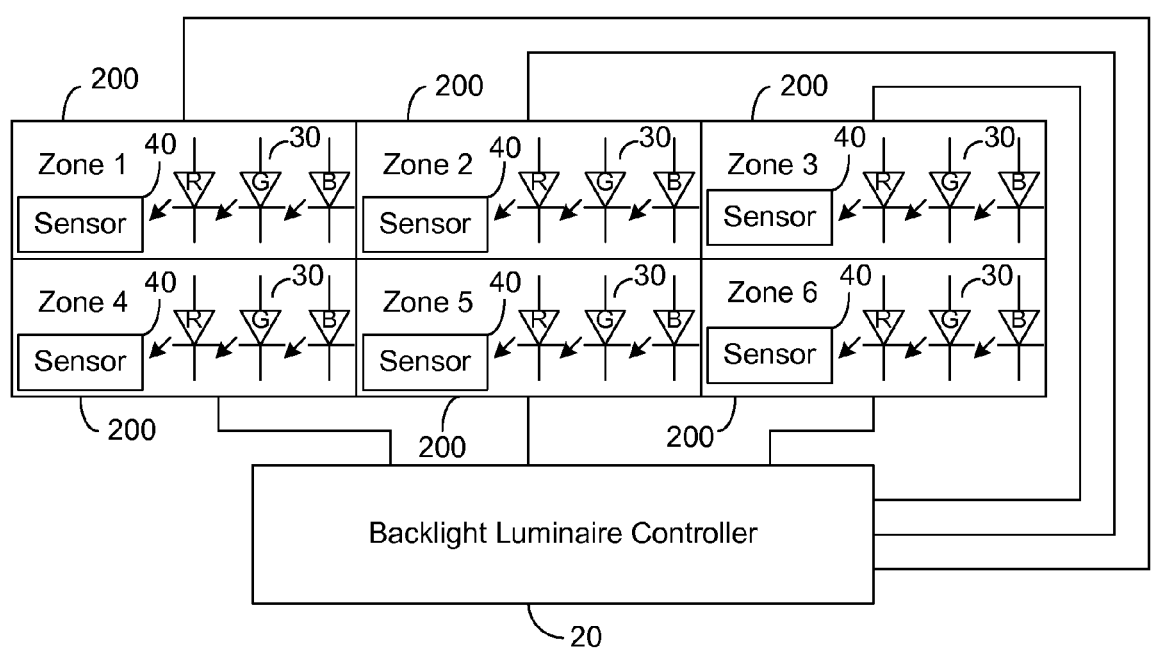
FIG. 4 illustrates a high level block diagram of a dynamic scanning backlight in accordance with a principle of the current invention exhibiting a plurality of zones.

FIG. 4 illustrates a high level block diagram of a dynamic scanning backlight in accordance with a principle of the current invention exhibiting a plurality of zones 200, in which 6 zones 200 are controlled by a single backlight luminaire controller 20 are shown. Each zone 200 comprises a plurality of LED strings 30, preferably at least one each of a red LED string 30, a blue LED string 30 and a green LED string 30. Each zone 200 further comprises an RGB color sensor 40. Each of the LED strings 30 and the RGB color sensors 40 are in communication with backlight luminaire controller 20. The detailed connections are not shown for simplicity.

Thus the present embodiments enable a color control loop operative to complete at least one cycle between a change in a target value and enabling an LED. Thus, the color control loop generates a correction to the PWM value of the LED responsive to the LED output prior to the change in target value and the new target value. Preferably, only a single cycle is performed prior to enabling the LED at the new value.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method of controlling the output of a luminaire comprising:
   receiving a first target signal associated with a first frame;
   generating a first light control signal for an on time portion of said first frame, said light control signal responsive to said received first target signal;
   sampling a light output during said on time portion of said first frame, the light output being responsive to said first light control signal;
   receiving a second target signal associated with a second frame, said second frame following said first frame;
   comparing said received second target signal associated with said second frame with said sampled light output of said on time portion of said first frame; and
   generating an error signal responsive to said comparing.

2. A method according to claim 1, further comprising:
   generating a second light control signal for an on time portion of said second frame, said generated second light control signal responsive to said generated error signal.

3. A method according to claim 1, wherein said generating said first light control signal comprises generating a pulse width modulated signal exhibiting a period and a duty cycle, and wherein said sampling the light output comprises:
   repeatedly sampling the light output during said on time portion of said first frame; and
   averaging said repeated samplings to generate an average per said period.

4. A method according to claim 3, wherein said sampled light output of said first frame being compared with said received second target signal is said average of said repeated samplings of a last period of said on time of said first frame.

5. A method according to claim 1, further comprising adjusting said first light control signal during said on time portion of said first frame responsive to said sampled light output of said on time portion of said first frame.

6. A method according to claim 5, wherein said generating said first light control signal comprises generating a pulse width modulated signal exhibiting a period and a duty cycle, and
   wherein said adjusting said first light control signal comprises adjusting said duty cycle.

7. A method according to claim 5, further comprising generating a pulse width modulated light control signal for an on time portion of said second frame exhibiting said period and a duty cycle responsive to said generated error signal.

8. A method according to claim 1, wherein said generating said first light control signal for said on time portion of said first frame comprises:
   enabling a pulse width modulation exhibiting a duty cycle and a period;
   enabling a feedback controller associated with said pulse width modulation; and
   adjusting, responsive to said enabled feedback controller, said duty cycle of said first light control signal during said on time portion of said first frame responsive to said sampled light output of said on time portion of said first frame.

9. A method according to claim 1, further comprising:
   receiving a synchronizing signal;
   waiting a first period; and
   enabling said first light control signal for said on time portion of said first frame at the expiration of said first period.

10. A method according to claim 9, wherein said first period is a function of the zone associated with the luminaire.

11. A method of controlling the output of a luminaire comprising a plurality of LED strings, the method comprising:
    receiving a first target signal associated with a first frame;
    generating a plurality of pulse width modulated first light control signals for a portion of said first frame responsive to said received first target signal, said pulse width modulated first light output signals exhibiting a period and a respective first duty cycle for each of the plurality of LED strings;
    sampling a light output of the plurality of LED strings at discrete intervals during said portion of said first frame, the light output being responsive to said pulse width modulated first light control signals;
    averaging said samples of said first frame over at least one of said period;
    adjusting, during said first frame, said first duty cycle of at least one of said plurality of pulse width modulated first light control signals responsive to said averaging;
    receiving a second target signal associated with a second frame, said second frame following said first frame;
    comparing said received second target signal with a least one of said averages; and
    generating a plurality of pulse width modulated second light control signals for a portion of said second frame exhibiting said period and a respective second duty cycle for each of the plurality of LED strings, said second duty cycles being responsive to said comparing.

12. A backlight luminaire controller for a frame by frame changing target signal, the backlight luminaire controller comprising:

a synchronizing controller;
a difference circuit;
a feedback controller responsive to said synchronizing controller and said difference circuit;
a pulse width modulation (PWM) functionality exhibiting a duty cycle and a period, said duty cycle being responsive to said feedback controller; and
an averager responsive to said feedback controller and operative to generate at least one average over an integer multiple of said period,
said feedback controller operative responsive to said synchronizing controller to generate a duty cycle for the next frame responsive to at least one of said generated at least one average of the current frame and a received target signal of said next frame.

13. A backlight system comprising:
a backlight luminaire controller according to claim 12;
a luminaire arranged to produce light responsive to said PWM functionality, said produced light exhibiting a luminance and a color balance;
a sensor arranged to receive a portion of said produced light;
a low pass filter arranged to receive the output of said sensor; and
an analog to digital converter in communication with said low pass filter,
wherein said averager is in communication with said analog to digital converter, said integer is one, and said averager is operative to output an indication of said luminance and said color balance of said produced light for at least one particular period of said pulse width modulation functionality.

14. A backlight system according to claim 13, wherein said low pass filter exhibits a cutoff frequency on the order of 1/10 of the frequency of said pulse width modulation period.

15. A backlight system according to claim 14, wherein said pulse width modulation functionality exhibits an n-bit division of said period, and said analog to digital converter exhibits a sampling rate less than the frequency associated with said n-bit division of said period.

16. A backlight system according to claim 13, further comprising a calibration matrix coupled to said averager and operative to convert said at least one average indication to a system consonant with the frame by frame changing target signal.

17. A backlight system according to claim 13, wherein said feedback controller is operative in a single cycle mode.

18. A backlight system according claim 17, wherein said synchronizing controller is operative to operate said feedback controller in said single cycle mode for a single cycle prior to producing light of said next frame from said luminaire.

19. An apparatus for controlling a luminaire responsive to a target signal with a value changing on a frame by frame basis, the apparatus comprising:
a feedback controller;
a signal generator, responsive to said feedback controller and operative to generate a light control signal for an on time portion of a first frame responsive to a first frame target signal value;
a sampler operative to sample a light output during said on time portion of the first frame, said light output being responsive to said generated light control signal of the first frame; and
a difference circuit arranged to compare a second frame target signal value with said sampled light output of said on time portion of the first frame and generate an error signal responsive to said comparison,
wherein said feedback controller is operative to control said signal generator to generate a light control signal for an on time portion of the second frame responsive to said error signal.

20. An apparatus according to claim 19, wherein said feedback controller is further operative to control said signal generator so as to adjust said light control signal during said on time portion of the first frame responsive to said sampled light output.

21. An apparatus according to claim 20, wherein said signal generator comprises a pulse width modulated functionality exhibiting a period and a duty cycle, and wherein said sampler is operative to:
repeatedly sample said light output during said on time portion of the first frame; and
average said repeated samplings to generate an average per said period,
wherein said control of said signal generator by said feedback controller is responsive to said average of said repeated samplings.

22. An apparatus according to claim 21, wherein said sampled light output of said first frame being compared with said second frame target signal value is said average of said repeated samplings of a last period of said on time of the first frame.

23. An apparatus according to claim 21, wherein said adjusting of said feedback controller comprises adjusting said duty cycle.

24. An apparatus according to claim 21, wherein said signal generator is further operative to generate a pulse width modulated signal for an on time portion of the second frame exhibiting said period and a duty cycle responsive to said feedback controller.

25. An apparatus according to claim 19, wherein said signal generator comprises a pulse width modulation functionality, and wherein said generating said light control signal for said on time portion of the first frame comprises:
enable said pulse width modulation exhibiting a duty cycle and a period; and
enable said feedback controller.

* * * * *

UNITED STATES PATENT AND TRADEMARK OFFICE
CERTIFICATE OF CORRECTION

PATENT NO. : 7,548,030 B2  
APPLICATION NO. : 12/049410  
DATED : June 16, 2009  
INVENTOR(S) : Dror Korcharz et al.

Page 1 of 1

It is certified that error appears in the above-identified patent and that said Letters Patent is hereby corrected as shown below:

Column 16, Claim 21, line 24 should read: comprises a pulse width "modulation" functionality Signed and Sealed this Fifteenth Day of September, 2009

David J. Kappos  
*Director of the United States Patent and Trademark Office*